United States Patent [19]
Tsutsui

[11] Patent Number: 6,141,305
[45] Date of Patent: Oct. 31, 2000

[54] OPTICAL DISK RECORDING AND REPRODUCING APPARATUS AND METHOD AND TRACKING SERVO APPARATUS AND METHOD

[75] Inventor: Keiichi Tsutsui, Kanagawa, Japan

[73] Assignee: Sony Corporation, Tokyo, Japan

[21] Appl. No.: 09/159,749

[22] Filed: Sep. 23, 1998

[30] Foreign Application Priority Data

Sep. 25, 1997 [JP] Japan ..................................... 9-260267

[51] Int. Cl.[7] ...................................................... G11B 7/00
[52] U.S. Cl. ........................................... 369/44.32; 369/54
[58] Field of Search ............................. 369/44.11, 44.25, 369/44.27, 44.28, 44.29, 44.32, 44.33, 44.35, 54, 58

[56] References Cited

U.S. PATENT DOCUMENTS

5,677,899  10/1997  Getreuer ................................ 369/44.28
5,974,007  10/1999  Getreuer ..................................... 369/32

*Primary Examiner*—Paul W. Huber
*Attorney, Agent, or Firm*—Frommer Lawrence & Haug, LLP.; William S. Frommer

[57] ABSTRACT

In an optical disk recording and reproducing apparatus, a brake operation timing signal (H) is generated by a brake operation timing signal generating unit (8) from an RF signal and a tracking error signal delivered from an optical pickup which is provided with an objective lens (5) converging a laser light and irradiating the same on an optical disk 1, a light receiving portion receiving a return light from the optical disk and an objective lens actuator (6), while a shock sensor output (L) from a shock sensor (7) is compared with a predetermined level by a shock level comparing unit 12. Under the control of a control unit (11), only when the output from the shock sensor (7) exceeds a predetermined value, a brake operation to suppress a track jump is carried out by an actuator drive circuit unit (10) based on the brake operation timing signal (H), to thereby suppress a track jump caused by an impact from the outside.

6 Claims, 6 Drawing Sheets

OPTICAL DISK RECORDING AND REPRODUCING APPARATUS AND METHOD AND TRACKING SERVO APPARATUS AND METHOD

BACKGROUND OF THE INVENTION

1. Field of the Invention

The present invention relates to an optical disk recording and reproducing apparatus and a method which perform a brake operation by a tracking servo and also relates to a tracking servo apparatus and a method of an optical disk drive apparatus.

2. Description of the Related Art

A so-called CD (compact disk), on which an audio signal is recorded, has come into wide use, and further an optical disk which is large in data capacity and high in recording density is highly required.

In order to increase the recording density of an optical disk, the track pitch thereon is narrowed to thereby increase the recording density of the optical disk. For example, the track pitch of a CD is 1.6 $\mu$m, while the track pitch of a so-called DVD (digital video disk or digital versatile disk) having a capacity about 7 times of the CD is 0.74 $\mu$m. Due to the narrow track pitch and high compressing technology, the DVD has the recording desity about 7 times the recording density of the CD.

By the way, as the track pitch of the optical disk becomes narrower, there is easily caused a so-called track jump by a vibration or impact (here, vibration and impact are all together referred to as a shock) from the outside. Therefore, it is necessary that, in a disk drive apparatus which drives an optical disk with a narrow track pitch, the track jump caused by the shock applied to its optical pickup (optical head) from the outside is suppressed.

In a tracking servo apparatus of a conventional optical disk drive apparatus, after the tracking servo is effected or taken in and after the track jump, a brake is applied to a lens actuator which drives an objective lens.

Then, a tracking servo apparatus of a conventional optical disk drive apparatus, in which a brake is applied to a tracking servo, will be now described with reference to FIG. 6 which shows an arrangement of an example of the present invention described later on and FIG. 7 which shows its timing chart used for explaining its operation. In FIG. 7, the timing chart when a light beam from an objective lens moves from the inner periphery of an optical disk to its outer periphery in the radius direction is shown in the left side, and the timing chart when the light beam moves from the outer periphery to the inner periphery of the optical disk is shown in the right side.

The optical disk has grooves of concentric circles or a groove of spiral shape and information is recorded on the bottom of groove or a land to form a pit series. As shown in FIG. 6, a detecting signal (RF(radio frequency)signal) A form a photo-detector of an optical pickup (optical head) in the optical disk drive apparatus is supplied to an envelope detection and filter process circuit 31, its envelope is detected, and its detected output is filter-processed to remove noise components thereof. An envelope detected output B, from which noise components are removed, from the circuit 31 is supplied to a zero-cross comparator circuit 32 to provide a land/groove discrimination signal C. These circuits 31 and 32 form a land/groove discrimination signal generating circuit.

Meanwhile, as the land/groove discrimination signal generating circuit, in addition to the above-mentioned circuit, there may be a low pass filter which is supplied with the RF signal to generate a land/groove discrimination signal, a phase difference detecting circuit which is supplied with a light detecting signal of two reproduced light beams reflected from an optical disk to generate a land/groove discrimination signal, and so on.

The land/groove discrimination signal C obtained from the zero-cross comparator circuit (zero-cross comparator) 32 has a rectangular waveform indicated by C in FIG. 7 in which a high (H) level shows a land portion, while a low (L) level shows a groove portion, respectively. The land/groove discrimination signal C is supplied to a D flip-flop 36 at its D input terminal, and a zero-cross edge signal G of a tracking error signal D (whose waveform is not shown in FIG. 7) is supplied to the clock input terminal of the D flip-flop 36 which samples the land/groove discrimination signal C by the zero-cross edge signal G of the tracking error signal D to produce a brake operation timing signal H at its noninverting output terminal.

Next, the circuit which generates the zero-cross edge signal G of the tracking error signal D will be now described. The tracking error signal D is supplied to a filter process circuit 33 which produces a tracking error signal E from which noise components are removed. This tracking error signal E is supplied to a zero-cross comparator circuit 34. A compared output F from this zero-cross comparator circuit 34 is supplied to an edge detecting circuit 35 which then produces the zero-cross edge signal G which indicates a rising edge and a trailing edge of the tracking error signal D.

The brake operation timing signal H is a rectangular waveform signal as shown in FIG. 7. Its high level indicates a cut-off state of the tracking servo loop, while its low level indicates an operation state of the tracking servo loop.

The tracking error signal D is further supplied to a tracking servo filter process circuit 38 in which its noise components are removed and then is outputted as an actuator drive signal I through a change-over switch 39. A brake operation ON/OFF signal, which goes to a high level when the brake is in an ON-state while goes to a low level when the brake is in an OFF-state, and the brake operation timing signal H are supplied to an AND-gate 37. The changing operation of the change-over switch 39, which changes over the output from the tracking servo filter process circuit 34 and a zero level (ground level), is controlled by the output from the AND-gate 37 such that when the output of the AND-gate 37 is in high level, the tracking error signal, whose noise components are removed, from the tracking servo filter process circuit 38 passes through the change-over switch 39 to become the actuator drive signal I, while when the output of the AND-gate 37 is low in level, the passing of the tracking error signal with no noise components through the change-over switch 39 is rejected and the actuator drive signal I becomes the zero level (ground level).

With reference to the actuator drive signal I shown in FIG. 7, when the brake is applied to the actuator, the relative velocity between the optical disk and the lens actuator becomes nearly zero and the tracking servo is easily taken in. Thus, the brake to the lens actuator is operated upon the tracking servo being taken in at first and the tracking servo being taken in after the track jump. During the recording or reproducing operation on or from the optical disk which is in a state that the tracking servo is taken in, the brake operation is released.

The tracking error signal during the recording or reproducing operation on or from the optical disk is nearly zero, so that a noise is easily contained in the zero-cross signal F of the tracking error signal D. Further, since the envelope detecting signal B of the FR signal, which is a base of the land/groove discrimination signal C during the recording or reproducing operation on or from the optical disk, is less in fluctuation, noise components are easily contained in the land/groove discrimination signal C at its portion near the zero level. Under the influence of noise components of these signals, the brake is operated during the recording or reproducing operation for the optical disk to release the tracking servo, and hence the tracking error is increased thereby.

According to the tracking servo apparatus of the optical disk drive apparatus which drives an optical disk narrow in track pitch and large in recording density, as described before, the tracking servo comes off by a large vibration or a large shock applied to the optical pickup (optical head) from its outside and hence the track jump is caused easily. Once the track jump is caused, the tracking servo, which is effected in a tracking servo range of the tracking error signal, is effected in a tracking non-servo range opposite in polarity to the tracking servo range of the tracking error signal and hence the track jump occurs frequently. In order to minimize such a track jump, it is necessary that when a track jump appears, the servo applied to the lens actuator is made off to apply a brake to the lens actuator. The track jump is minimized by the brake to thereby make it possible that a return time period of the tracking servo after the vibration and shock are applied to the optical pickup from the outside is shortened, the excess drive of lens actuator is suppressed, and a trouble of the lens actuator can be avoided. It is necessary that when the vibration and shock are applied to the optical pickup from the outside, a brake is applied to the lens actuator rapidly.

However, due to the fact that the track pitch becomes narrower, when vibration and shock are applied from the outside, a so-called track jump is easily caused exceeding a track range. In the recording and reproducing of an optical disk with a large data capacity, since its track pitch is narrow, it is easily affected by the vibration and shock from the outside.

Especially, when a large shock is applied to an apparatus from its outside, a tracking servo comes off with ease and hence a track jump is generated. Once the track jump appears, an unnecessary output outside the tracking servo range is applied which increases the track jump successively.

Therefore, in the recording and reproducing of the optical disk large in data capacity, such a measure is necessary that even if a shock is applied, its influence is reduced.

In order to minimize the track jump, the tracking servo should perform a brake operation. By minimizing the track jump, the return time period after the shock being applied from the outside can be shortened and also the excess drive of the actuator can be suppressed to avoid the trouble of the apparatus. To this end, it is required such a measure to immediately initiate the brake operation upon the application of shock.

SUMMARY OF THE INVENTION

In view of the above point of view, it is an object of the present invention to provide an optical disk recording and reproducing apparatus and a method which, upon being applied with a shock, actuates a brake operation to avoid a track jump as well as a tracking servo apparatus and a method of an optical disk drive apparatus.

According to an aspect of the present invention, there is provided an optical disk recording and reproducing apparatus which records and/or reproduces an information signal on and/or from an optical disk, comprising an optical pickup located in an opposing relation to an optical disk and having an objective lens for focussing and irradiating a laser light on the optical disk, a light receiving means for receiving a return light from the optical disk and an objective lens driving means for driving the objective lens at least in a radius direction of the optical disk; a deviation signal generating means for generating a deviation signal corresponding to a deviation from a record track on the optical disk nearest a focussing point of the laser light to the focussing point in the radius direction based on a light detected by the light receiving means; a servo means for driving the objective lens by the objective lens driving means in a direction to recover the deviation based on the deviation signal from the deviation signal generating means; a brake signal generating means for generating a brake signal, from which unnecessary components to take in a servo operation of the servo means are removed, from the deviation signal of the deviation signal generating means, a brake means for driving the objective lens in a driving direction of the objective lens based on the deviation signal in the servo means in accordance with the brake signal from the brake signal generating means; a shock detecting means for detecting a shock applied to the optical pickup from an outside; and a control means for switching an operation of the servo means to an operation of the brake means only when a level of a shock detected by the shock detecting means exceeds a predetermined value.

Specifically, according to the optical disk recording and reproducing apparatus of the present invention, when it detects a shock applied thereto from its outside and the shock is detected to be such one that the tracking servo in the radius direction of the optical disk may come off, the brake operation of the tracking servo is continued until the influence of the shock will disappear.

Another aspect of the present invention, there is provided an optical disk recording and reproducing method, according to which, in the optical disk recording and reproducing apparatus which records and/or reproduces an information signal on and/or from an optical disk by using an optical pickup located in an opposing relation to an optical disk and having an objective lens for focussing and irradiating a laser light on the optical disk, a light receiving means for receiving a return light from the optical disk and an objective lens driving means for driving the objective lens at least in a radius direction of the optical disk, there are a deviation signal generating step for generating a deviation signal corresponding to a deviation from a record track on the optical disk nearest a focussing point of the laser light to the focussing point in the radius direction based on a light detected by the light receiving means; a servo step for driving the objective lens by the objective lens driving means in a direction to recover the deviation based on the deviation signal from the deviation signal generating step; a brake signal generating step for generating a brake signal, from which unnecessary components to take in a servo operation of the servo step are removed, from the deviation signal of the deviation signal generating step; a brake step for effecting a brake operation on driving of the objective lens in a driving direction of the objective lens based on the deviation signal in the servo step in accordance with the brake signal from the brake signal generating step; a shock detecting step for detecting a shock applied to the optical pickup from an outside; and a control step for switching a servo operation of said servo step to a brake operation of the brake step only when a level of a shock detected by the shock detecting step exceeds a predetermined value.

According to a further aspect of the present invention, there is provided a tracking servo apparatus of an optical disk drive apparatus which has a tracking servo means for detecting a tracking error signal of a focussing light beam emitted from an objective lens of an optical head and irradiated on an optical disk having a groove is detected and for supplying the tracking error signal to a lens actuator driving the objective lens, and a brake operation timing signal generating means for generating a brake operation timing signal based on the tracking error signal and a land/groove discrimination signal of the focussing light beam and in which a brake is applied to the tracking servo means by the brake operation timing signal, wherein there is provided a shock detecting means provided the optical head, whereby the supply of the brake operation timing signal to the tracking servo means is controlled in accordance with a level of a shock detecting signal from the shock detecting means.

According to such the present invention, in accordance with the level of the shock detecting signal from the shock detecting means, the supply of the brake operation timing signal to the tracking servo means is controlled.

DESCRIPTION OF THE PREFERRED EMBODIMENTS

An embodiment of the present invention will be described with reference to the accompanying drawings.

As embodiments of an optical disk recording and reproducing apparatus and a method as well as a tracking servo apparatus and a method of an optical disk drive apparatus according to the present invention, an optical disk recording and reproducing apparatus for recording/reproducing an information signal on/from an optical disk will be described.

Figure 1:
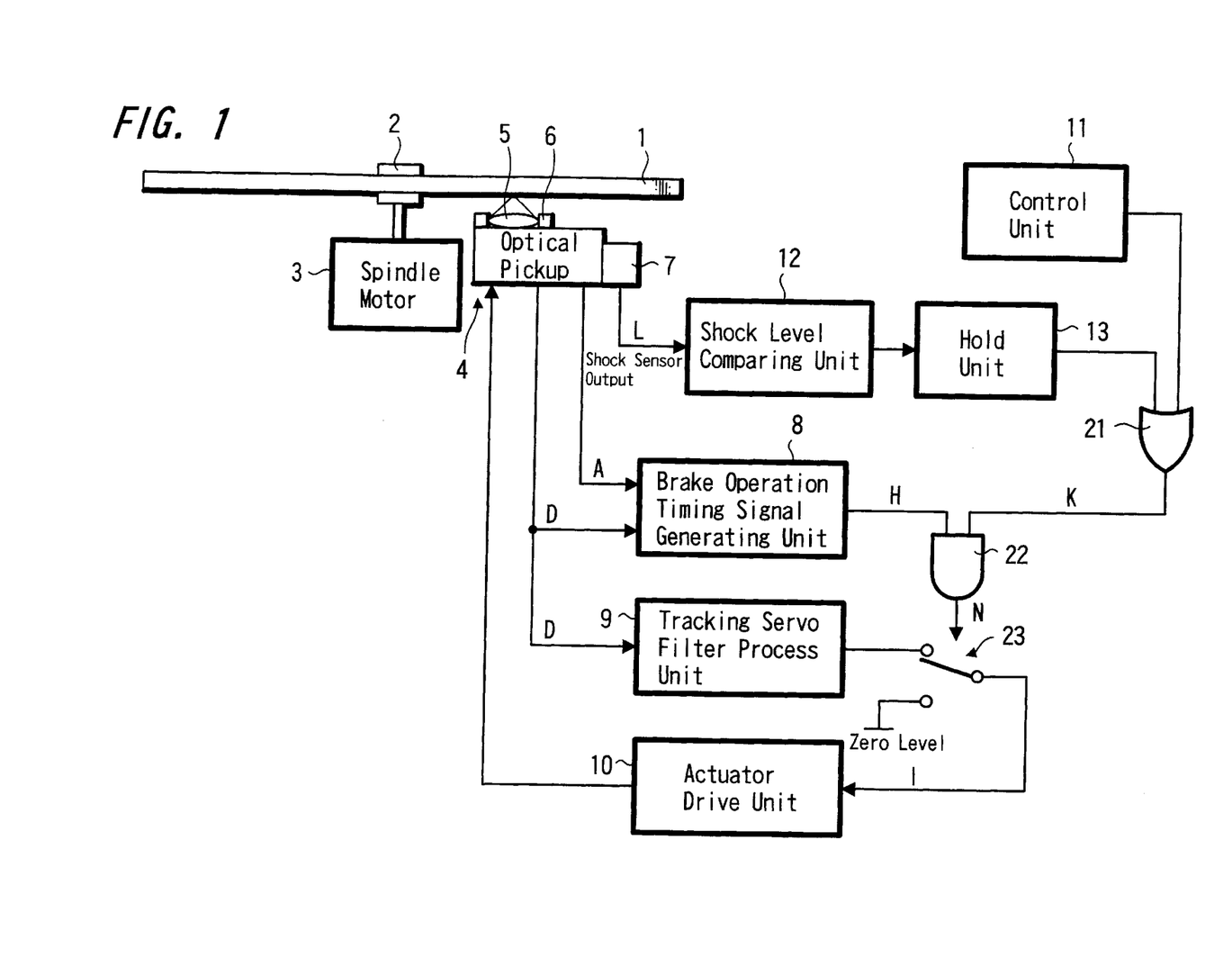
FIG. 1 is a diagram schematically showing an arrangement of an optical disk recording and reproducing apparatus.

As shown in FIG. 1, the optical disk recording and reproducing apparatus comprises a chucking member 2 gripping an optical disk 1 at the center position and fixing the same and a spindle motor 3 rotating the optical disk 1 through the chucking member 2.

Further, the optical disk recording and reproducing apparatus comprises an optical pickup 4, which is provided with an objective lens 5 located in an opposing relation to the optical disk 1 and focussing and irradiating a laser light on the recording surface of the optical disk 1, and an actuator 6 serving as an objective lens drive means for driving the objective lens 5 in a focus direction, namely direction along which the objective lens 5 approaches and comes apart from the recording surface of the optical disk 1, and in a tracking direction which is the radius direction of the optical disk 1, and a shock detecting means i.e. a shock sensor 7 attached to the optical pickup 4 to detect a shock or impact. The optical pickup 4 has, though not shown, a light receiving unit for receiving a return light from the optical disk 1.

Further the optical disk recording and reproducing apparatus comprises a shock level comparing unit 12, which compares a shock sensor output L from the shock sensor 7 serving as the shock detecting means for detecting a shock from the outside with a predetermined reference level and outputs a compared result, a hold unit 13 for the output from the shock level comparing unit 12, a control unit 11 to control the shock detection, and an OR unit 21 to perform an OR calculation of the outputs from the hold unit 13 and the control unit 11.

Furthermore, the optical disk recording and reproducing apparatus includes a brake operation timing signal generating unit 8 inputted with an RF signal A and a tracking error signal D from the optical pickup 4 and generating a brake operation timing signal H and an AND unit 22 performing an AND calculation for the brake operation timing signal H from the brake operation timing signal generating unit 8 and a brake operation ON/OFF signal R from the OR unit 21.

The optical disk recording and reproducing apparatus also has a tracking servo filter process unit 9 performing the filter process for the tracking servo serving as the servo means from the tracking error signal D or deviation signal from the light receiving means and the succeeding deviation signal detecting means, though not shown, of the optical pickup 4, a switch 23 subjecting the output from the tracking servo filter process unit 9 to an ON/OFF in accordance with the output N from the AND unit 22 to cut off its unnecessary portion, and an actuator drive unit 10 driving the actuator 6 by the output I, whose unnecessary portion is cut off by the switch 23, from the tracking servo filter process unit 9.

In this case, the portion including the control unit 11, the shock level comparing unit 12, the hold unit 13, the OR unit 21, the AND unit 22 and the switch 23 forms a control unit which changes over the operation from the tracking servo operation to the brake operation when the shock from the outside exceeds a predetermined value.

In the optical disk recording and reproducing apparatus arranged as above, the optical disk 1 is fixed by the chucking member 2 and rotated by the spindle motor 3. The laser light emitted from the optical pickup 4 is focussed on the optical disk 1 to apply thereto a recording laser power upon the recording time while a reproducing laser power upon the reproduction time. The objective lens 5 of the optical pickup 4 is driven by the actuator 6. In order to focus the laser light on the data surface or signal recording surface of the optical disk 1 and to follow up a target track, there are carried out the focus servo in the direction to approach or come apart the optical disk 1 and the tracking servo in the radius direction of the optical disk 1.

The optical disk recording and reproducing apparatus comprises the optical pickup 4 having the objective lens 5 disposed in an opposing relation to the optical disk 1 and irradiating the laser light on the optical disk 1 in a focussed state and the actuator 6 driving the objective lens 5 in the focus direction and the tracking direction of the optical disk 1.

The tracking servo of the optical disk recording and reproducing apparatus drives, in accordance with a deviation in the tracking direction from a track on the optical disk 1 nearest a focussed point of the laser light irradiated from the objective lens 5 to the focussed point, the actuator 6 in a direction to recover the deviation in the tracking direction.

In other words, the actuator 6 is driven in accordance with a tracking error signal provided in correspondence with the deviation to make the objective lens 5 recover its deviation.

In the optical disk recording and reproducing apparatus, when the magnitude of an external shock detected by the shock sensor 7 provided on the optical pickup 4 as the shock detecting means exceeds a predetermined value, the brake operation is made on so as to avoid the tracking servo from coming off.

The brake operation is carried out by a brake means which makes the tracking servo on by removing the unnecessary signal to effect or take in the tracking servo from the tracking error signal and only when the direction in the tracking direction of the objective lens 5 to take in the tracking servo is opposite to the direction in which the tracking servo drives the objective lens 5 in the tracking direction.

In this case, in order to make the optical disk 1 high in density, as the objective lens 5 installed in the optical pickup 4 so as to oppose the optical disk 1, there may be utilized a 2-group lens realizing a high numerical aperture (NA).

Figure 2:
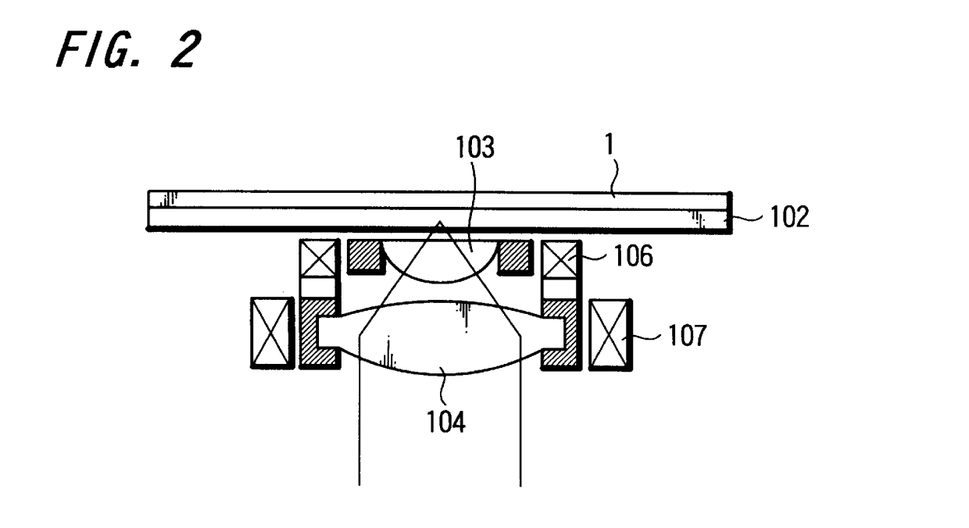
FIG. 2 is a cross-sectional view showing an arrangement of a 2-group lens.

As shown in FIG. 2, the 2-group lens is formed of two lenses, or a front lens 103, whose surface on the side of the optical disk 1 is flat while whose surface on the side of an objective lens 104 is a curved surface of aspheric, and the objective lens 104 which is an aspherical lens. A hemispherical lens formed of a flat surface and a spherical surface may be used as the front lens 103.

The 2-group lens, or the front lens 103 and the objective lens 104 are driven by an actuator 106 and an actuator 107.

The actuator 106 moves the front lens 103 relative to the objective lens 104 in an optical axis direction (in FIG. 2, up and down direction). The front lens 103 and the objective lens 104 are moved in one optical axis direction (in focus direction) by a voltage applied to the actuator 106.

The actuator 107 is a 2-axis actuator and is moved in a direction perpendicular relative to the track on the optical disk 1 (tracking direction). When being supplied with driving signals in the focus direction and the tracking direction, the actuator 107 adjusts the distance of the 2-group lens (the front lens 103 and the objective lens 104) from the optical disk 1 and moves the laser light or beam in the perpendicular direction relative to the track on the optical disk 1.

According to the above-mentioned arrangement, the distance between the objective lens 104 and the optical disk 1 can be adjusted by the actuator 107 similar to a conventional 2-group lens and also the distance between the front lens 103 and the objective lens 104 can be adjusted by the actuator 106. By adjusting the distance between the two lenses and the distance between the objective lens 104 and the optical disk 1 in accordance with the thickness of a disk substrate 102 of the optical disk 1, the generation of spherical aberration can be suppressed.

The 2-group lens uses a light source with the wavelength larger than 680 nm and has a high NA more than 0.7, for example 0.81. The working distance between the jobjective lens 104 and the optical disk 1 is less than 560 $\mu$m, for example, 100 $\mu$m. Therefore, the 2-group lens has a high NA, a small clearance against the optical disk 1 and its aberration is reduced.

Figure 3:
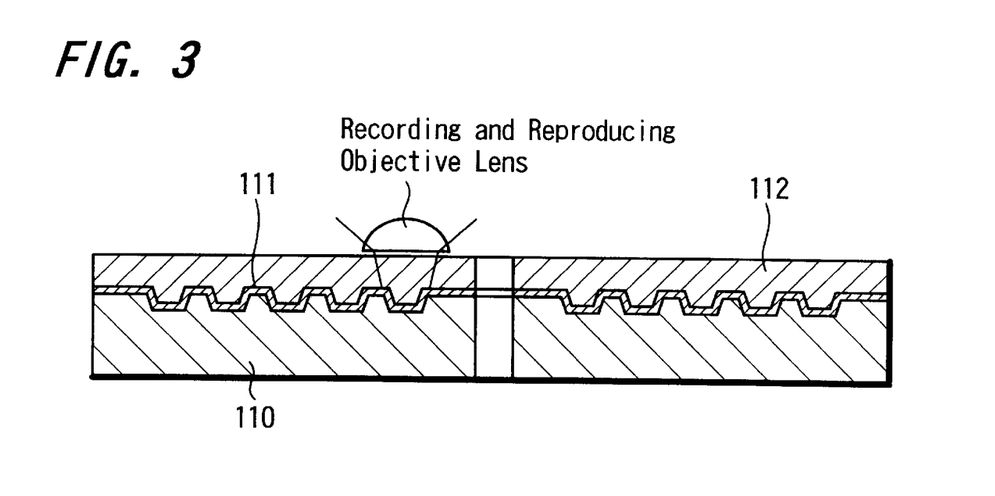
FIG. 3 is a cross-sectional view showing an optical disk.

Next, an example of the optical disk 1 will be described with reference to FIG. 3.

A stamper realizing a pitch and a pitch irregularity is used and a replica substrate 110 is formed by an injection molding method. Then, a recording film or reflection film 111 is formed on a signal surface of the replica substrate 110. If the optical disk is a ROM, for example, the reflection film made of Al or the like is formed.

Further, a cover layer 112 is formed on the recording film or reflection film 111. For example, the cover layer is formed in such a manner that on the film formed on the substrate by any structure mentioned above an ultraviolet ray hardening resin, namely UV resin is dropped, rotated and extended. Alternatively, the cover layer may be formed such that a sheet of poly carbonate is bonded by the ultraviolet ray hardening resin.

The thickness of the light transmission layer formed as mentioned above is exemplified as 3–177 $\mu$m.

Then, an operation of the optical disk recording and reproducing apparatus will be described about a case where the take in is performed for the optical disk as an example with reference to the circuit portion in FIG. 1 and a signal waveform at each circuit unit thereof shown in FIG. 4.

Figure 4:
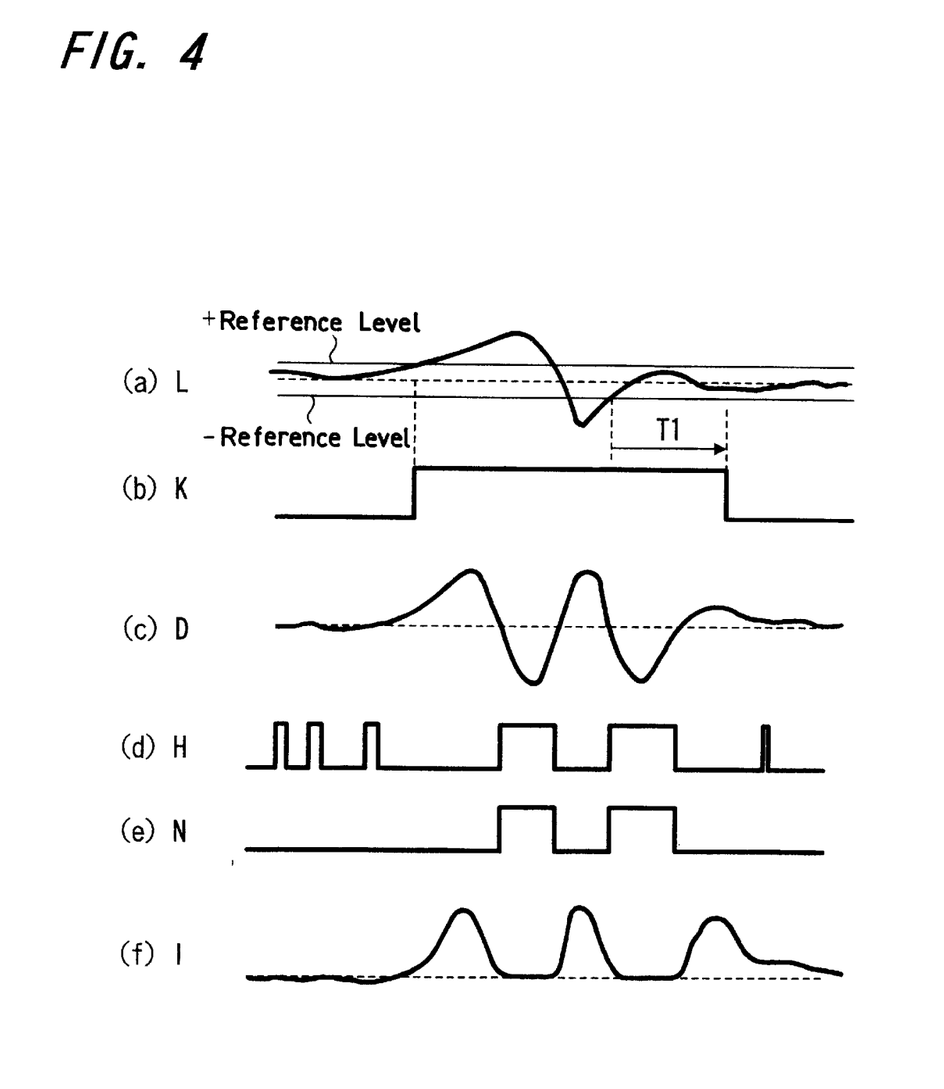
FIG. 4 is a timing chart showing a signal waveform at each unit of the optical disk recording and reproducing apparatus.

The shock sensor 7 attached to the optical pickup 4 outputs a shock sensor output signal L shown at (a) in FIG. 4 in response to the shock detected by the shock sensor 7.

The shock level comparing unit 12 compares the shock sensor output L from the shock sensor 7 with predetermined positive and negative reference levels ($\pm$reference levels) and outputs a compared result. Usually, the shock from the outside is vibratory, and during a time when the shock continues, the output from the shock level comparing unit 12 becomes a pulse train.

The hold unit 13 holds the output from the shock level comparing unit 12 during a time period T1 determined by estimating a time period in which the influence of shock will be reduced or the shock will be alleviated.

The control unit 11 outputs a signal making a brake operation on/off. However, since the signal from the hold unit 13 is input to the OR unit 21 to be subjected to the OR calculation with the output of the control unit 11, the ON/OFF of the brake operation during the recording and reproducing are followed to the output from the hold unit 13.

Accordingly, a brake operation ON/OFF signal K shown at (b) in FIG. 4 goes to a high level until a shock is applied and its influence is alleviated. During that period, the brake operation is on. That is, even if the shock sensor output L becomes lower than the reference level of the shock level comparing unit 12 and the pulse goes down, the brake operation ON/OFF signal K maintains its high level over the time period T1.

The brake operation timing signal generating unit 8 uses the FR signal A and the tracking error signal D shown at (c) in FIG. 4 from the optical pickup 4 and generates the brake operation timing signal H shown at (d) in FIG.4.

The tracking servo filter process unit 9 is input with the tracking error signal D from the optical pickup 4. The unnecessary components of the output from the tracking servo filter process unit 9 are cut off by the switch 23 which is controlled in its ON/OFF by the output N shown at (e) in FIG. 4 of the AND unit 22. As a result, the actuator drive signal I, from which the unnecessary components are cut off by the switch 23, becomes such an output whose unnecessary components are zero, and hence the brake is effected only in the direction in which the lens jumps a track due to the shock.

By driving the actuator 6 in this way, the brake signal carrying out the brake operation is obtained by removing the components unnecessary for taking in the tracking servo. The brake operation signal corresponds to the actuator drive signal I shown at (f) in FIG. 4.

According to the optical disk recording and reproducing apparatus of the present invention, as described above, even though a shock is applied thereto from the outside, the tracking servo comes off and a track jump is caused, the track jump can be suppressed minimum by the brake operation, and the tracking servo can be instantaneously taken in again.

Figure 5:
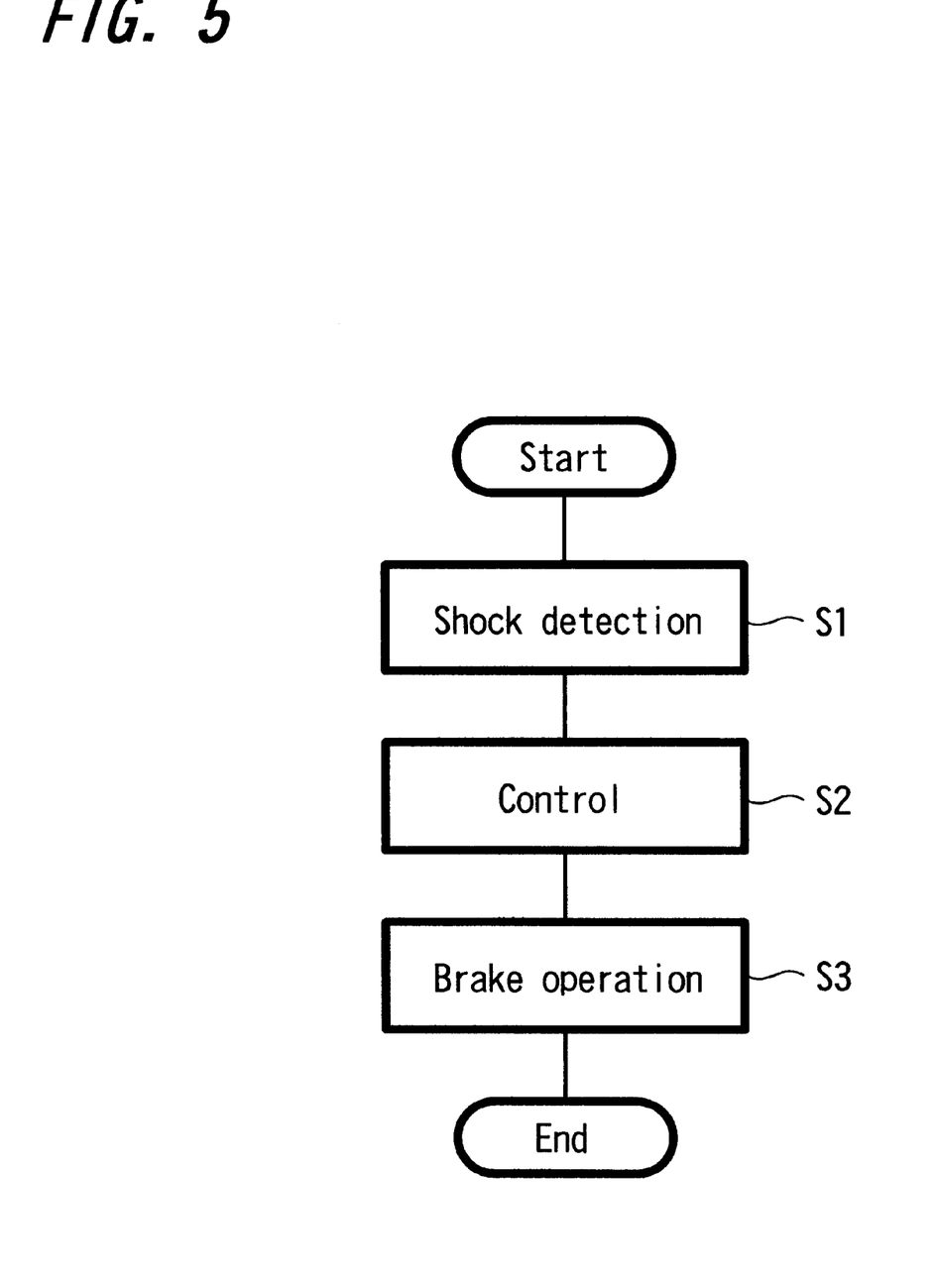
FIG. 5 is a flow chart showing a sequence of processes concerning an optical disk recording and reproducing method of the present invention.

Next, a series of processes concerning an optical disk recording and reproducing method will be explained with reference to the flow chart shown in FIG. 5.

This optical disk recording and reproducing method uses an optical pickup located in an opposing relation to an optical disk and having an objective lens for focussing and irradiating a laser light on the optical disk and an actuator for driving the objective lens at least in a tracking direction of the optical disk, and a tracking servo driving, in accordance with a deviation of a record track on the optical disk nearest a focussing point of the laser light to the focussing point in the tracking direction, the actuator in a direction to recover the deviation in the tracking direction, and records and/or reproduces an information signal on and from the optical disk.

In first step S1, an output from the shock sensor provided on the optical pickup is detected. Then, the process proceeds to step S2.

In step S2, such a control is carried out that only when the level of shock detected in step S1 exceeds a predetermined value, the above-mentioned brake process is executed. Then, the process proceeds to step S3.

In step S3, only when the direction in which the actuator drives the objective lens in the tracking direction by the tracking servo is reverse to the tracking direction component of the velocity of the objective lens, the brake operation to make on the tracking servo is performed. Then, a series of the processes concerning the optical disk recording and reproducing method are ended.

According to the optical disk recording and reproducing method of the present invention, as described above, even though a shock is applied thereto from the outside, the tracking servo comes off and a track jump is caused, the track jump can be suppressed minimum by the brake operation and the tracking servo can be instantaneously taken in again.

Next, the brake operation of the optical disk recording and reproducing apparatus will be explained with reference to the brake operation circuit shown in FIG. 6 and a waveform at each unit of the brake operation circuit shown in FIG. 7. This brake operation carries out such a brake operation to control the actuator after the taking in of the tracking servo and the track jump.

Figure 6:
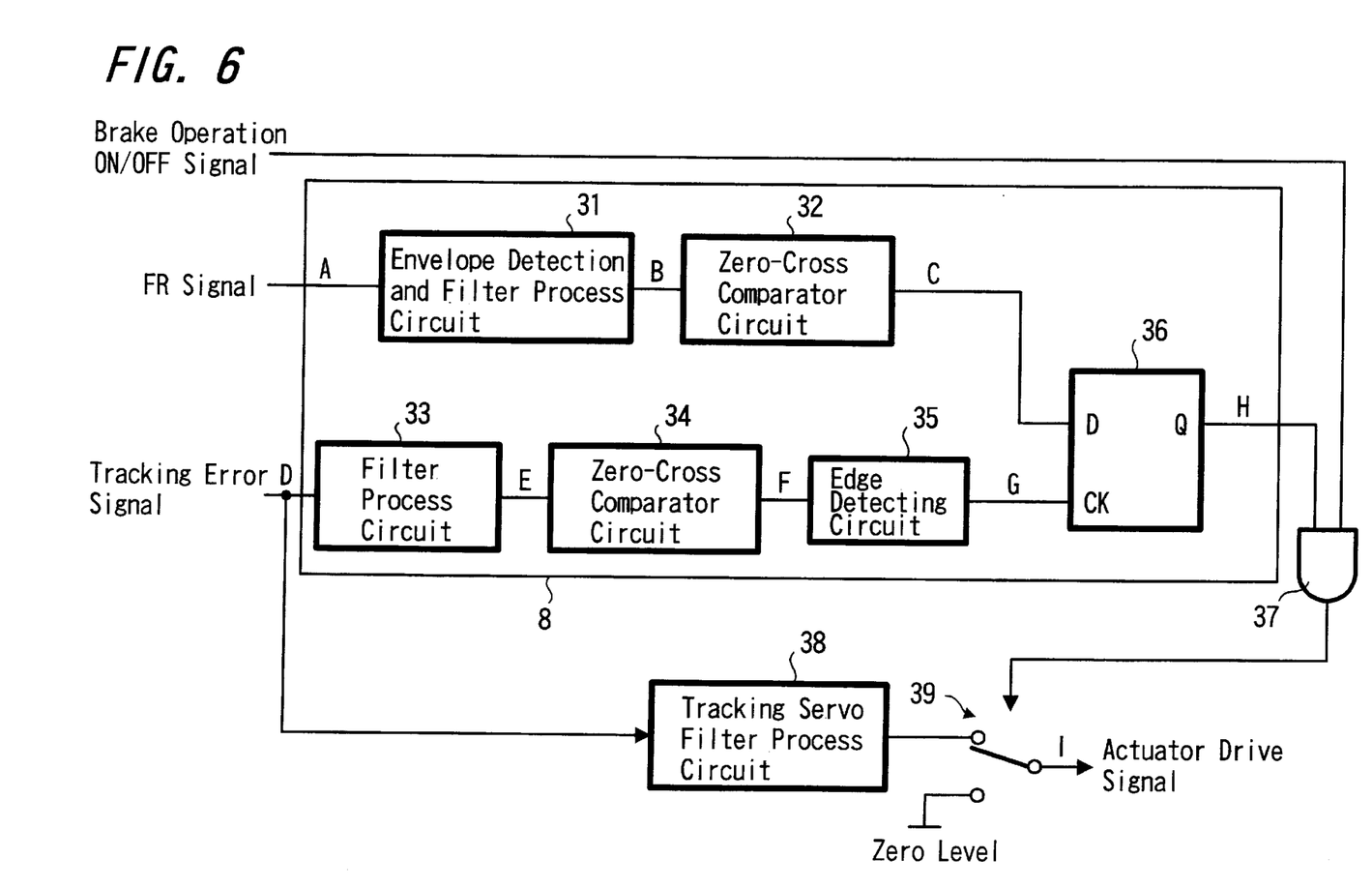
FIG. 6 is a block diagram showing a brake operation circuit.
Figure 7:
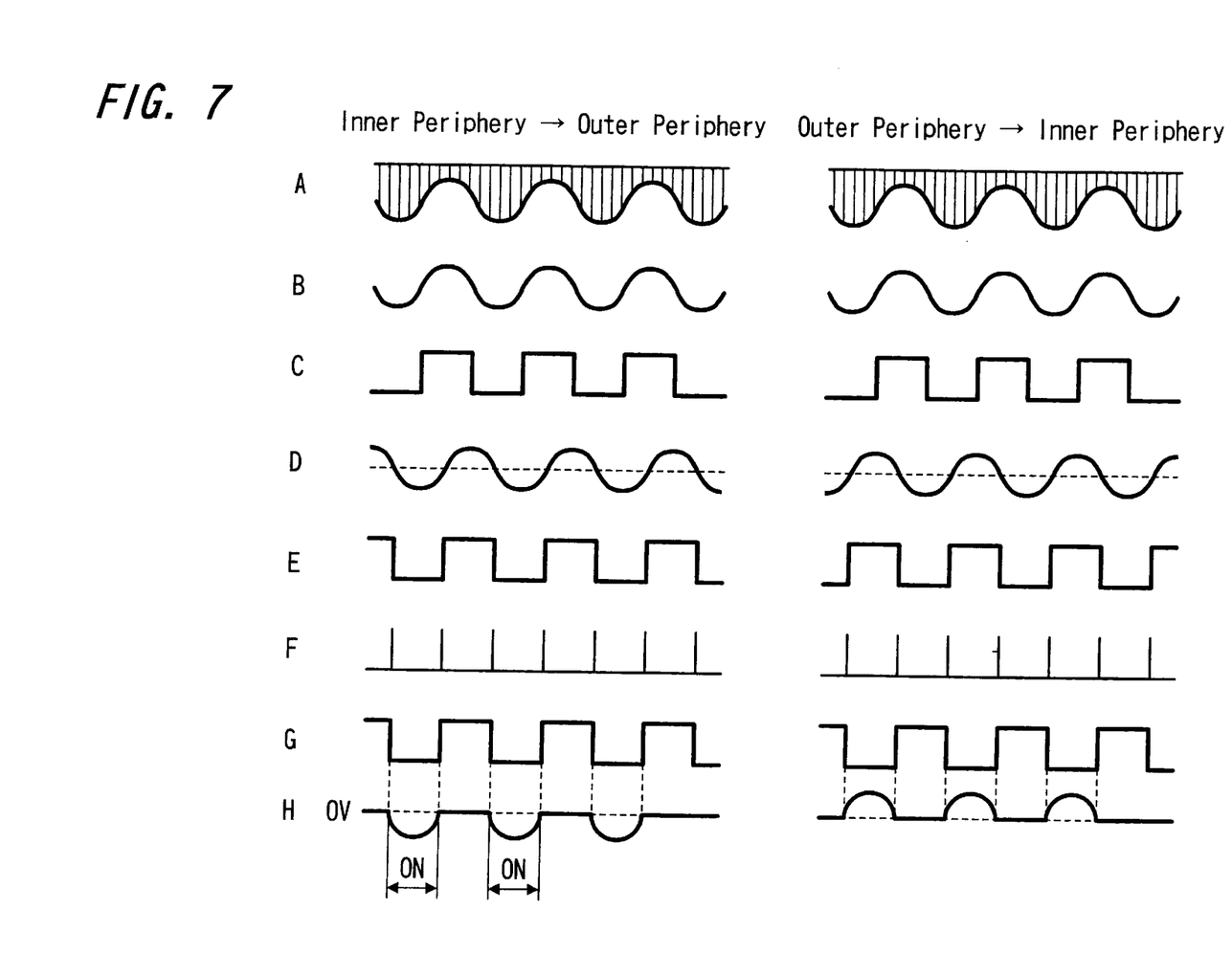
FIG. 7 is a view showing a signal waveform at each unit of the brake operation circuit.

In the brake operation circuit of FIG. 6, the envelope detection filter unit 31 envelope-detects and filter-processes the RF signal A to output a signal B from which noise components are removed. The zero-cross comparator unit 32 zero-cross compares the signal B from the envelope detection filter unit 31 to produce the land/groove discrimination signal C. The land/groove discrimination signal C is a signal which goes to a high level in a land portion but a low level in a groove portion.

In this case, although the land/groove discrimination signal C is formed by envelope-detecting the RF signal A, the signal C can be produced by subjecting the RF signal A to a LPF (Low Pass Filter) processing, or from a phase difference of a push-pull signal of a side beam.

The zero-cross edge signal G can be obtained by such a manner that the tracking error signal D is filter-processed by the filter process unit 33 so as to remove its noise, its output signal E is zero-cross compared by the zero-cross comparing unit 34 to be the signal F, and a rising-up edge and a trailing-down edge of the signal F are detected by the edge detection unit 35.

The brake operation timing signal H can be obtained by fetching the land/groove discrimination signal C in the D flip-flop 36 by the zero-cross edge signal G of the tracking error signal D.

In other words, during a period in which the brake operation timing signal H is in high level, the tracking servo loop is cut off and unnecessary portions are cut, whereby the brake is effected. This fact is shown in the actuator drive signal I.

Due to the fact that the brake is effected by the actuator drive signal I, the relative velocities of the lens actuators driving the optical disk and the objective lens become closer and the tracking servo becomes to be easily taken in. To this end, the brake operation circuit is used upon the first taking-in of the tracking servo and upon the taking-in of the tracking servo after the track jump.

However, during the recording and reproducing after the tracking servo is taken in, the brake operating function is made off. During the recording and reproducing, the track error is near zero and a noise will be apt to appear in the zero-cross signal of the tracking error signal. Further, since the fluctuation of a signal, which is a base of the land/groove discrimination signal C, is less, a noise easily appears at the zero comparing portion of the land/groove discrimination signal C. If the brake operation is caused in the recording and reproducing by the influence of the noise of the above signals, the servo is released and the track error increases.

The brake operation signal performing the brake operation by driving the actuator as described above is obtained by eliminating the components unnecessary to take in the tracking servo. The brake operation signal corresponds to the actuator drive signal I.

If it is supposed that the brake is not effected, there is raised such a problem that the actuator drive signal I is swung to the plus and the minus similar to the tracking error signal D with the result that the brake is not effect in view of DC and the lens jumps tracks repeatedly.

As compared with the brake operating circuit explained as above, according to the optical disk recording and reproducing apparatus shown in FIG. 1, the brake operation timing signal H and the brake operation ON/OFF signal K generated from the shock sensor output L from the shock sensor 7 detecting the shock are AND-calculated by the AND unit 22 to eliminate a pulse due to erroneous detect in to make it possible that the brake operation is effected only upon the shock being applied.

Further, since the optical disk recording and reproducing apparatus suppresses the track jump in minimum for the shock and shortens the system return time, it is possible that if recorded data is an image and a sound, for example, interruption of the image or sound can be suppressed for an instant.

Further, in the optical disk recording and reproducing apparatus, dependent on the system, if the return time is short, it can be absorbed by a buffer in the system to thereby avoid the interruption.

In the brake operation circuit shown in FIG. 6, the envelope detection filter process unit 31, the zero-cross comparator unit 32, the filter process unit 33, the zero-cross comparator unit 34, the edge detection unit 35 and the D flip-flop 36 form a brake operation timing signal generating unit for generating an operation timing signal with respect to the brake operation.

In the optical disk recording and reproducing apparatus, the structure of each block is shown as the circuit unit, it may be realized by calculation process through a DSP (digital signal processor).

An arrangement, which is a premise of the present invention, is the tracking servo apparatus of an optical disk driving apparatus having a tracking servo means in which a tracking error signal of a focussing light beam emitted from an objective lens of an optical head and irradiated on an optical disk having a groove is detected and then is supplied to a lens actuator driving the objective lens, and a brake operation timing signal generating means for generating a brake operation timing signal based on the tracking error signal and a land/groove discrimination signal of the focussing light beam, wherein a brake is applied to the tracking servo means by the brake operation timing signal.

In the above arrangement to be premised, the tracking servo apparatus of the optical disk driving apparatus has a shock detecting means provided on its optical head, in which, in accordance with the level of a shock detecting signal from the shock detecting means, the supply of the brake operation timing signal to the tracking servo means is controlled.

Another premise of the present invention is a tracking servo method of an optical disk driving apparatus in which a tracking error signal of a focussing light beam emitted from an objective lens of an optical head and irradiated on an optical disk having a groove is detected and then is supplied to a lens actuator driving the objective lens to perform a tracking servo, and a brake operation timing signal is generated based on the tracking error signal and a land/groove discrimination signal of the focussing light beam, wherein a brake is applied to the tracking servo by the brake operating timing signal.

In the above method of the present invention to be premised, in accordance with the level of a shock detecting signal obtained by detecting a shock applied to the optical head, the supply of the brake operation timing signal to the lens actuator is controlled.

As the embodiment of the present invention, while the optical disk recording and reproducing apparatus is described, the tracking servo apparatus and the method for the optical disk drive apparatus concerning the present invention are not limited to the optical disk recording and reproducing apparatus.

As described above, in the optical disk recording and reproducing apparatus, when a shock is detected, the brake operation is carried out by using the tracking servo. Therefore, even when the tracking servo comes off and a track jump is caused, it is possible to the minimize the track jump and to take in the tracking servo again instantaneously.

Also, according to the optical disk recording and reproducing method, when a shock is detected, the brake operation is performed by using the tracking servo, so that even though the tracking servo comes off and a track jump is caused, it is possible to minimize the track jump and to take in the tracking servo again instantaneously.

Further, according to the present invention, there is provided a tracking servo apparatus of an optical disk driving apparatus having a tracking servo means, in which a tracking error signal of a focussing light beam emitted from an objective lens of an optical head and irradiated on an optical disk having a groove is detected and then is supplied to a lens actuator driving the objective lens, and a brake operation timing signal generating means for generating a brake operation timing signal based on the tracking error signal and a land/groove discrimination signal of the focussing light beam, wherein a brake is applied to the tracking servo means by the brake operation timing signal, in which a shock detecting mean is provided on the optical head, and the supply of the brake operation timing signal to the tracking servo means is controlled in accordance with a level of a shock detecting signal from the shock detecting means, whereby the generation of a track jump due to a vibration and an impact applied to the optical head from the outside is suppressed, and also a return from the track jump state to a normal tracking servo state can be rapidly realized.

Furthermore, according to the present invention, there is provided a tracking servo method of an optical disk driving apparatus, in which a tracking error signal of a focussing light beam emitted from an objective lens of an optical head and irradiated on an optical disk having a groove is detected and then is supplied to a lens actuator driving the objective lens to thereby perform the tracking servo, and a brake operation timing signal is generated on the basis of the tracking error signal and a land/groove discrimination signal of the focussing light beam, and a brake is applied to the tracking servo by the brake operation timing signal, wherein the supply of the brake operation timing signal to the lens actuator is controlled in accordance with a level of a shock detecting signal from a shock detecting means provided on the optical head, so that the generation of a track jump caused by a vibration and an impact applied to the optical head from the outside is suppressed as well as the return from the track jump state to the normal tracking servo state can be realized rapidly.

Having described embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A tracking servo apparatus of an optical disk driving apparatus having a tracking servo means, in which a tracking error signal of a focussing light beam emitted from an objective lens of an optical head and irradiated on an optical disk having a groove is detected and then is supplied to a lens actuator driving said objective lens, and a brake operation timing signal generating means for generating a brake operation timing signal based on said tracking error signal and a land/groove discrimination signal of said focussing light beam, wherein a brake is applied to said tracking servo means by said brake operation timing signal comprising:

a shock detecting mean provided on said optical head; and a control means for controlling a supply of said brake operation timing signal to said tracking servo means in accordance with a level of a shock detecting signal from said shock detecting means.

2. An optical disk recording and reproducing apparatus which records and/or reproduces an information signal on and/or from an optical disk, comprising;

an optical pickup located in an opposing relation to an optical disk and having an objective lens for focussing and irradiating a laser light on said optical disk, a light receiving means for receiving a return light from said optical disk and an objective lens driving means for driving said objective lens at least in a radius direction of said optical disk;

a deviation signal generating means for generating a deviation signal corresponding to a deviation from a record track on said optical disk nearest a focussing point of said laser light to said focussing point in said radius direction based on a light detected by said light receiving means;

a servo means for driving said objective lens by said objective lens driving means in a direction to recover said deviation based on the deviation signal from said deviation signal generating means;

a brake signal generating means for generating a brake signal, from which unnecessary components to take in a servo operation of said servo means are removed, from the deviation signal of said deviation signal generating means;

a brake means for driving said objective lens in a driving direction of said objective lens based on the deviation signal in said servo means in accordance with the brake signal from said brake signal generating means;

a shock detecting means for detecting a shock applied to said optical pickup from an outside; and a control means for switching an operation of said servo means to an operation of said brake means only when a level of a shock detected by said shock detecting means exceeds a predetermined value.

3. An optical disk recording and reproducing apparatus as claimed in claim 2, wherein said control means continues an operation of said brake means in a predetermined period of time from a time point when the level of shock detected by said shock detecting means does not exceed the predetermined value.

4. A tracking servo method of an optical disk driving apparatus having a tracking servo means, in which a tracking error signal of a focussing light beam emitted from an objective lens of an optical head and irradiated on an optical disk having a groove is detected and then is supplied to a lens actuator driving said objective lens, and a brake operation timing signal generating means for generating a brake operation timing signal based on said tracking error signal and a land/groove discrimination signal of said focussing light beam and in which a brake is applied to said tracking servo means by said brake operation timing signal, wherein a supply of said brake operation timing signal to said tracking servo means is controlled in accordance with a level of a shock detecting signal obtained by detecting a shock applied to said optical head.

5. An optical disk recording and reproducing method which records and/or reproduces an information signal on and/or from an optical disk by using an optical pickup located in an opposing relation to an optical disk and having an objective lens for focussing and irradiating a laser light on said optical disk, a light receiving means for receiving a return light from said optical disk and an objective lens driving means for driving said objective lens at least in a radius direction of said optical disk, comprising:

a deviation signal generating step for generating a deviation signal corresponding to a deviation of a record track on said optical disk nearest a focussing point of said laser light to said focussing point in said radius direction based on a light detected by said light receiving means;

a servo step for driving said objective lens by said objective lens driving means in a direction to recover said deviation based on the deviation signal from said deviation signal generating step;

a brake signal generating step for generating a brake signal, from which unnecessary components to take in a servo operation of said servo step are moved, from the deviation signal of said deviation signal generating step;

a brake step for effecting a brake operation on driving of said objective lens in a driving direction of said objective lens based on the deviation signal in said servo step in accordance with the brake signal from said brake signal generating step;

a shock detecting step for detecting a shock applied to said optical pickup from an outside; and a control step for switching a servo operation of said servo step to a brake operation of said brake step only when a level of a shock detected by said shock detecting step exceeds a predetermined value.

6. An optical disk recording and reproducing method as claimed in claim 5, wherein said control step continues said brake step in a predetermined period of time from a time point when the level of shock detected by said shock detecting step does not exceed the predetermined value.

* * * * *